United States Patent Office 3,293,771
Patented Dec. 27, 1966

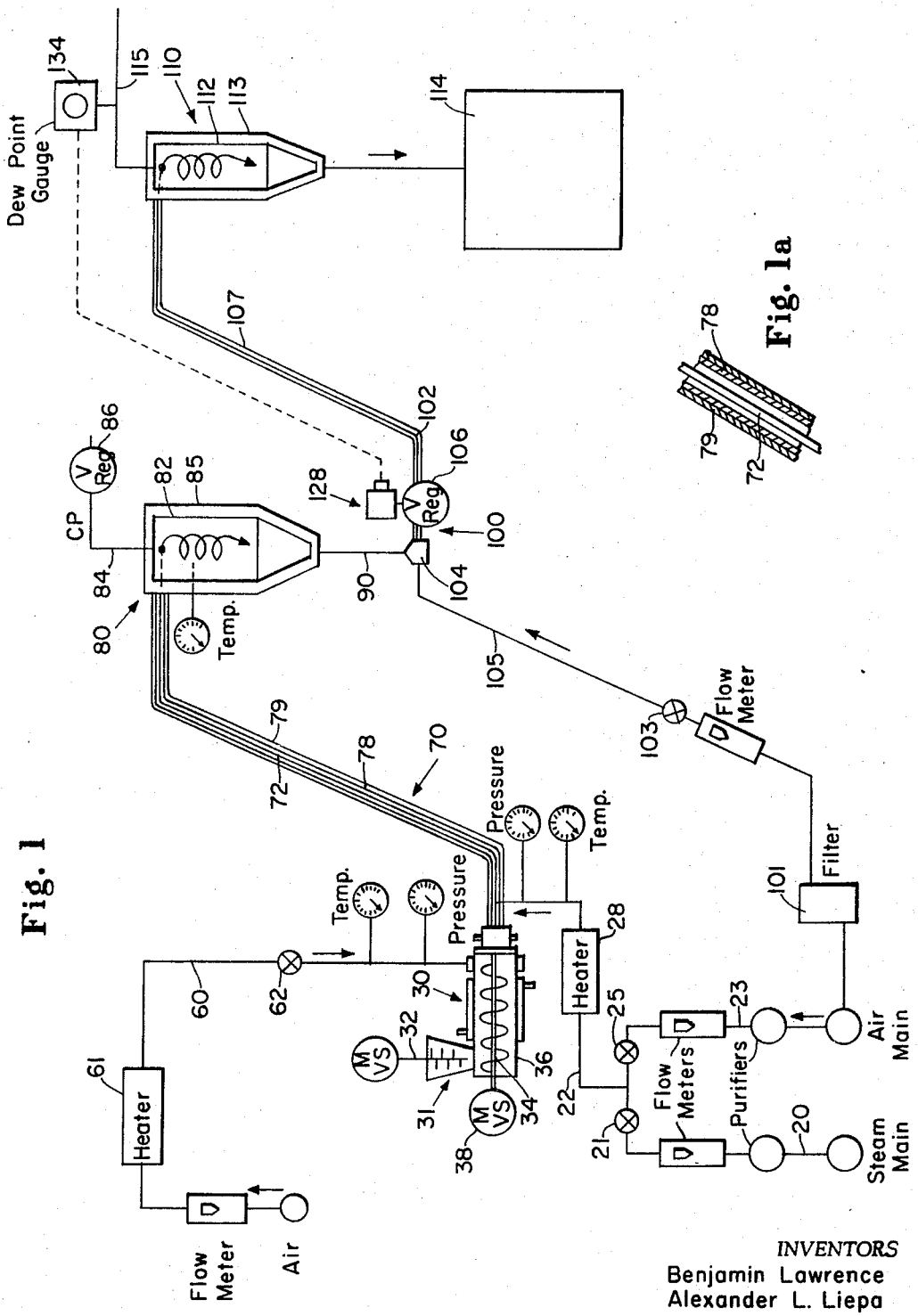

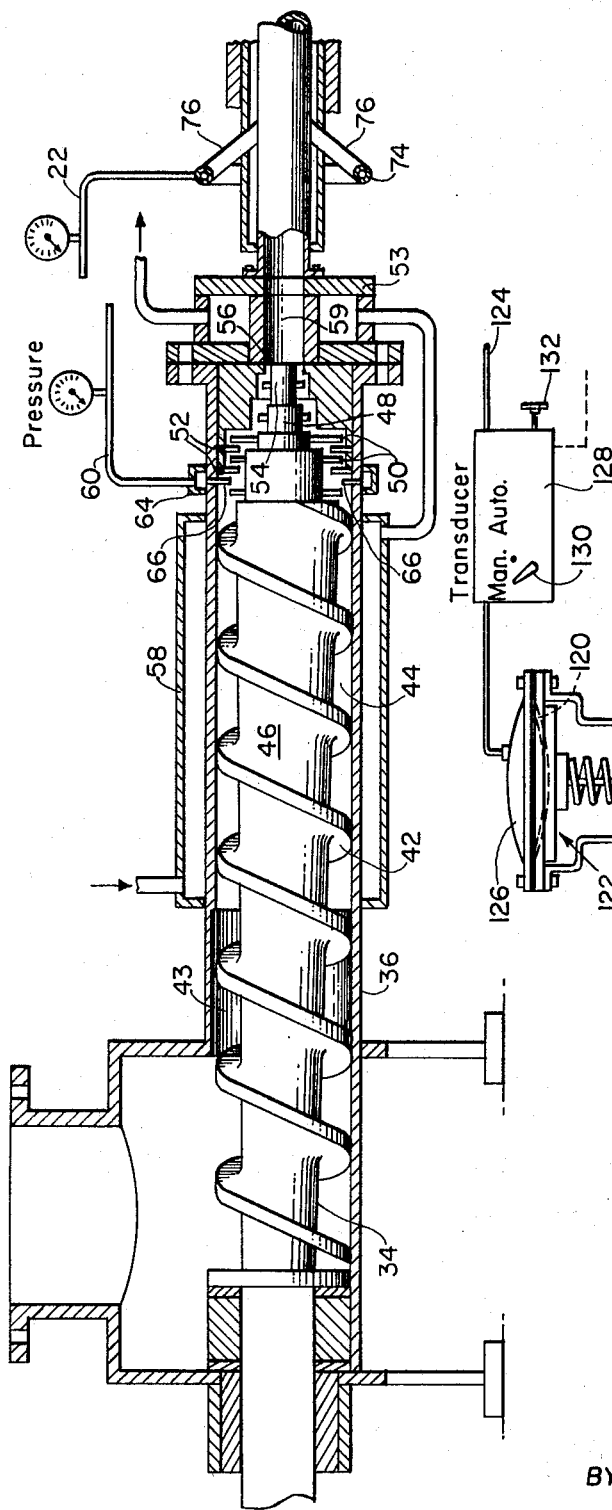
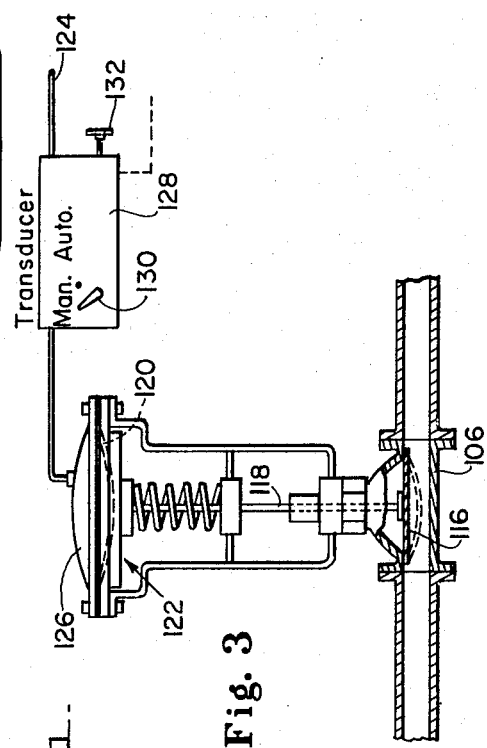

3,293,771
APPARATUS FOR TREATMENT OF FLOUR TO REDUCE MICROBIOLOGICAL CONTAMINATION
Benjamin Lawrence, Springfield Township, Hamilton County, and Alexander L. Liepa, Cincinnati, Ohio, assignors to The Procter & Gamble Company, Cincinnati, Ohio, a corporation of Ohio
Original application Dec. 31, 1962, Ser. No. 248,620, now Patent No. 3,159,494, dated Dec. 1, 1964. Divided and this application May 1, 1964, Ser. No. 381,277
3 Claims. (Cl. 34—57)

This is a division of our co-pending application Serial Number 248,620, filed December 31, 1962, now U.S. Patent 3,159,494.

This invention relates to apparatus for treating flour or the like to at least substantially eliminate contamination by non-sporeforming microorganisms.

Flour, after milling, is usually heavily contaminated with various microorganisms, including bacteria and fungi, such as mold and yeast. These contaminants, both in vegetative and spore form, are commonly carried by air and become lodged on equipment and/or human skin; they are, therefore, easily introduced into flour in the normal course of milling and handling by the operator, even in the unlikely event that the wheat is free of these organisms before milling. Before the advent of prepared culinary foods, microbiological contamination of flour did not present a serious problem. The flour was distributed through commercial channels in its normal relatively dry pulverulent condition which was unfavorable to the reproduction and multiplication of the microorganisms originally existent therein. Then, when the housewife purchased the flour and prepared it into doughs, pastries, batters, et cetera, they were baked the same day, providing a minimum opportunity for the microorganisms to increase to any serious extent before being inactivated by baking heat.

In the manufacture and sale of prepared culinary products, however, entirely different considerations come into play. Such products contain a relatively high moisture content, i.e. in excess of about 15% by weight, and must be able to tolerate a waiting period in distribution channels of from one week to several months between introduction by the manufacturer and baking by the ultimate consumer. The high moisture content and lengthy waiting period between preparation and baking combine to give the microorganisms almost ideal conditions in which to grow. If the product is partially cooked by the manufacturer as is the case, for example, with goods of the "brown and serve" variety, the bulk of the microorganism population is, of course, inactivated. However, partial cooking involves additional processing and the installation of special baking facilities which the producer might prefer to avoid and at best gives but limited shelf life. Also, many housewives have a preference for home baked edibles. Since the presence of micro-biological contamination in excess of certain specified levels is undesirable for a number of reasons, including the possibility of deleteriously affecting properties of the goods, the control of such contamination represents a critical problem to one desiring to market uncooked culinary products on a large scale.

Goods of the type to be kept outside of refrigeration, i.e. canned batters, dough, and the like, impose especially rigorous requirements, as most bacteria, including many pathogenic organisms, grow freely at room temperature in the presence of moisture. For such goods, it is essential that the flour employed therein approach absolute sterility as closely as possible. In the related application of Japikse and Lawrence, for "Method of Sterilizing Flour with Minimum Physicochemical Change," Serial No. 248,-619, filed December 31, 1962, now U.S. Patent 3,159,493, there is disclosed a treatment which has been devised with this objective particularly in mind. As is well known, the spores of spore-forming bacteria, e.g. of the genus Bacillus, are exceptionally resistant to destruction by heat, some species being able to withstand several hours in boiling water, for instance. Consequently, a sterilization treatment wherein the flour is subjected to heat under sufficiently severe conditions to destroy all forms of bacteria virtually inevitably results in some degradation in the functional characteristics of the flour for baking purposes. The damage may be minimized in extent as true of the process of the above identified application but it apparently cannot be completely eliminated. For the preparation of some types of goods, such as cakes, pastries and the like, which ordinarily use a relatively weak flour, a minor amount of damage may be quite acceptable. Other types, however, require a strong flour with peak performance characteristics so that a flour sterilized according to the related application may be poorly suited for use therein.

Fortunately, the spores of spore-forming bacteria do not normally germinate or multiply at refrigeration temperatures of about 40° F. Thus, for products that are to be maintained under refrigeration, the principal sources of concern are non-spore-forming bacteria, such as micrococci, and fungi, such as yeast and molds. These classes of microorganisms and the vegetative cells of the sporeformers are relatively susceptible to destruction by heat and it has been found that they can be devitalized by treatment under substantially more moderate conditions than is required for virtually complete sterilization according to the related application, which conditions are quite favorable to the preservation of the desirable functional qualities of the flour. Thus, the present process may be seen to be a modification of the former process to produce a flour essentially free of non-sporeforming microorganisms and of substantially unchanged functionality for use in the formulation of uncooked prepared culinary products intended to be maintained under refrigeration in the interim between preparation by the manufacturer and baking by the consumer.

In general, the process contemplates at least substantially uniformly heating contaminated flour while in intimate contact with an atmosphere containing steam or water vapor to a temperature within the range of about 200–250° F. and above the dew point of the atmosphere, retaining the flour at said temperature and in contact with said atmosphere for a time sufficient to at least substantially destroy the non-sporeforming microorganisms in said flour, said atmosphere being maintained under a pressure providing an absolute steam partial pressure of at least 1.5 p.s.i., and then cooling said heated flour to a temperature below the degradation point of the starch thereof, the flour remaining at a temperature in excess of the starch degradation point for a total time not greater than about 60 seconds. Such a treatment has been found extremely effective against molds and micrococci, samples of the treated flour being found by biological examination to be completely free of observable surviving organisms of these classes in a large number of instances and over 99% free in virtually all instances. The flour is indistinguishable from untreated flour in appearance, odor and flavor, and exhibits good functionality essentially comparable for many baking purposes to that of untreated flour.

As employed herein, the term "flour" is intended to embrace farinaceous materials comprised by protein and starch generally. Thus, it includes but is not limited to flours and/or meals derived from wheat, corn and other cereal grains, such as rye, barley, as well as from certain legumes, such as soy beans, peanuts and the like.

In order that the class of materials just described be rendered at least essentially free of nonsporeforming microorganisms within a period of time providing essentially no opportunity for heat damage to occur, it has been found that the temperature to which the flour is heated should fall generally within the range of about 200–250° F. Temperatures significantly below the lower end of this range cannot be depended upon to be consistently effective for various types of flours and varying levels of initial contamination. From the standpoint of microorganism destruction alone, temperatures above this range would be quite permissible or even desirable. However, such temperatures greatly increase the risk of the flour undergoing some degradation in contrast to the almost complete preservation of its functionality achieved by operation within this range. Treatment between about 210° F. and about 240° F. is preferred with optimum results being obtained at about 230–240° F.

The total time that the flour is allowed to remain at a temperature capable of damaging its functional characteristics is a maximum of about 60 seconds. As an easy point of reference, the starch gelatinization temperature, which is about 130–140° F., is considered to be the point at which functional damage begins. As a practical matter, one will more often than not begin and end the treatment with the flour at a temperature at or near room temperature and it may be found more convenient for the entire treatment time between these limits to fall within the same maximum. However, since no significant damage to the functionality of the flour occurs while the flour is below about 130–140° F. even for relatively long periods, the length of time the flour is held below this temperature can be varied rather widely and is by no means critical to the practice of the invention. The minimum time the flour may be maintained within the operative range of 200–250° F. to achieve devitalization of the non-sporeforming microorganisms present therein is not quite so readily defined. It has been established that exposure to such a temperature for a few seconds, say from 2–10 seconds, is entirely adequate but it is believed that even a momentary exposure of about 0.1–1 second is all that is actually required. Considering the fact that any working system will inherently have a finite period of lag time as heat is built up and then removed from the flour, it is thought that this unavoidable lag time is sufficient to accomplish the desired result. A preferred time range at the optimum temperatures is ¼–10 seconds. For good performance when operating at the lower end of the operative temperature range, exposure for a period in excess of that inherent in the system is recommended, say from 10–30 seconds, as the effect of the treatment upon the microorganisms is to a considerable extent dependent upon an inverse relationship of time to temperature, longer times being advantageous with lower temperatures and vice versa.

The exposure of the heated flour to a minimum partial pressure of steam, i.e. water vapor, of at least about 1.5 p.s.i. has been found to be essential to the attainment of the basic objectives as herein outlined. The reasons for this are not completely understood. Presumably, the presence of water vapor increases the destruction rate of sensitive microorganisms more than the degradation rate of flour at a given temperature. Whatever the reason, and the invention is not construed as confined to any precise explanation, this condition has been found to hold true in practice. In order for this partial pressure to exist, some steam must be present in the atmosphere with which the flour is in intimate contact during the heating treatment. The amount of steam in this atmosphere may conveniently vary from as low as about 10 mol percent to as high as about 80 mol percent, with about 30–75 mols being a more usual range. Below about 10 mol percent, the amount of steam present is too small to make any significant contribution to the rate of microorganism destruction. At levels above about 80 mol percent, on the other hand, the tendency for water to be condensed upon the flour under some desirable operating conditions often creates serious difficulties, particularly in connection with certain modes of continuous processing. Moreover, it is always better to avoid wetting the flour. In the processing of isolated small batches, an atmosphere composed exclusively of steam could perhaps be tolerated, but any advantage of a higher content of steam does not normally warrant the increased cost and the likelihood of problems arising therefrom.

The composition in the remainder of the prevailing atmosphere does not appear to matter greatly provided it is inert with respect to flour under the conditions of treatment. Thus, any of the common inert gases qualify for admixture, either alone or in combination, with steam to form the steam-containing atmosphere of the process, including air, nitrogen and carbon dioxide, among others. Air, of course, is readily available at nominal cost and is preferred.

The provision of the requisite atmosphere just described means, by necessary implication under many circumstances, that the treatment will be carried out under superatmospheric pressure. This follows from the fact that the system in which the flour is treated will usually be isolated from its surroundings, in either an absolute or relative sense, in order to maintain the desired atmosphere. Consequently, pressurization may be required to achieve relative isolation of a dynamic system, i.e. a system wherein the flour particles are in motion with the gaseous mixture forming the treatment atmosphere being provided at one point and exhausted to the surroundings at another, or may be created as a result of a static system being heated to treatment temperature. The existence of some pressure appears, in fact, to promote the efficacy of the treatment, permitting reduction in its duration and/or temperature with an accompanying lessening in the risk of damage to the flour. The extent of pressure may be varied widely consistent with the needs, on the one hand, for the minimum partial pressure of water vapor and, on the other, for avoiding contact of the flour with significant quantities of condensed water. A range of pressure found satisfactory for the great majority of cases is 5–30 p.s.i.g. 10–25 p.s.i.g. is preferred. In the case of dynamic systems, where the pressure may vary, at least the average pressure, and better yet the minimum pressure, should fall within this range. While higher pressures are not precluded, they are not necessary and, indeed, are better avoided since they introduce mechanical problems in the design of operative systems, require higher temperatures to avoid condensation, and increase the tendency for the flour to be damaged. For reasons that will be next explained, if the steam content is sufficiently high, a positive gauge pressure is not absolutely necessary, at least from a theoretical standpoint; instead, a negative gauge pressure up to 5–10 p.s.i. can be used to give the pressure differential needed to drive the hot fluidizing gas through the system. Obviously, however, operation at negative gauge pressure imposes much more stringent problems in designing and operating a working system and is less advantageous for this reason. The minimum pressure at which the system can be operated with useful results is governed by a limiting relationship of the system pressure and steam content of the atmosphere such as to provide the minimum partial pressure of the water vapor. Under the relatively mild treatment conditions contemplated herein and with the classes of microorganisms to be eliminated, an absolute partial pressure of steam of at least 1.5 p.s.i. is considered to be the minimum level at which these classes can be expected to be destroyed to a significant degree. It is well known that the absolute partial pressure of a given gas in a mixture of gases is approximately the multiple of the proportion of gas present in the mixture on a molar basis and the total pressure of the gas mixture. Knowing this relationship, the mole percent of steam present in the treatment atmosphere, and the required absolute partial pressure of steam, one can readily determine the minimum permissible pressure under which the atmosphere should be maintained. From a practical standpoint, the absolute steam partial pressure will ordinarily significantly exceed the just-stated minimum. Thus, partial pressure values of about 5–20 p.s.i. steam have proved quite effective and even higher values could be used if desired.

It will be apparent that the processing conditions just enumerated will be a weighty factor in the choice of a specific mechanical system for carrying out the process. In particular, the abbreviated time of exposure can be achieved only in a system that is capable of compensating for the naturally poor bulk heat transfer characteristics of flour since the flour must not only be heated to operative temperature but must be cooled to some non-degrading temperature, all within the stated period. Thus, the system must be designed to bring about an efficient exchange of heat between the flour and the heating and cooling mediums. It will also be understood that the heating and/or cooling must be accomplished in substantially uniform fashion with respect to all of the flour in the same condition at the same time. In other words, in the case of batch processing, all of the flour in the batch must be heated and then cooled at approximately the same rate, while in the case of continuous or semi-continuous processing, the same must be true of the increment of flour passing through a given phase of the treatment at a given time. This is important in order to avoid the possibility of overtreating some parts of the flour while undertreating other parts, as this would lead to non-uniform performance in the preparation of ultimate products, or non-uniform microbial destruction.

In general, these and other considerations related to satisfactory processing have been found to be quite well satisfied by systems wherein the flour is maintained in a relatively diffused state during the treatment so as to be in intimate contact with the treatment atmosphere, and with the heating medium or source in the event the two are not the same, during the heating step and with the cooling medium or source during the cooling step. A relatively diffused state for the flour can be obtained in any of several ways, for example, by subjecting the flour to vigorous agitation in the treatment zone or while passing through the treatment zone. More particularly, the present process lends itself extremely well to fluidization techniques whereby the flour is suspended in a gaseous fluidization medium either in the form of a bed or as a moving stream. It will be seen that the fluidization medium can conveniently be utilized to furnish both the steam-containing atmosphere and the heat necessary to raise the temperature of the flour quickly to within the operative range or, alternatively, to supply just the heat where the moisture content of the flour being processed is sufficient to provide the necessary proportion of water vapor for the desired period of time when evaporated by the heated fluidization medium, or even simply to convey while heat is supplied through the walls of the container or by other means.

Bed fluidization is now a well known unit operation and it is believed unnecessary to describe in detail how one might go about adapting existing technology in this field to the practice of the invention. It should be sufficient to state that the flour would be introduced into a vessel of suitable dimensions having a screen or other porous false bottom retaining the flour thereon, beneath which the fluidizing medium is introduced in sufficient quantity and velocity to support the flour thereon, the outlet to the vessel being equipped with dust separating and re-cycling means, such as one or more cyclones discharging the medium to the surroundings and returning the recovered flour dust to below the bed level. For details and various helpful design suggestions, reference may be had to Chemical Engineering, May 1953, pages 219–231. In the operation of this arrangement, the fluidizing medium during the heating phase can conveniently be air containing the desired portion of steam heated to operative temperature, whereas during the cooling phase, the steam-containing air is replaced by sterile air alone at a temperature below the degradation point, for example, room temperature. A purge gas, such as heated air alone, can be introduced between the phases to make the transition smoother and minimize caking on account of condensation, if this problem should arise.

Thus, in the drawing,

FIG. 1 is a schematic diagram of one embodiment of a two-stage fluidization system according to the invention;

FIG. 1a is an enlarged sectional view of the fragment of the hot fluidization stage;

FIG. 2 is a detail view in partial cross-section of a preferred feeding mechanism for fluidizing the flour in the arrangement of FIG. 1; and FIG. 3 is a detail view in partial cross-section of a preferred form of throttling valve employed in the second stage of the system of FIG. 1.

For convenience, the flour feeding, hot fluidization and part of the flour separation stages incorporated into the arrangement of FIG. 1 are the same as disclosed and described in connection with the related application identified above, to which reference may be had for a clearer illustration of certain details of the apparatus.

According to the embodiment of FIG. 1, steam is taken by way of a supply line 20 from any suitable source, e.g. a steam main, as may be available at the manufacturing installation, and if necessary, passed through a purifier to remove any condensed moisture, oil or solid particles therein. The purifier may be equipped with a bottom outlet and steam trap for discharging condensed moisture to a sewer, none of which is shown. From the purifier, the steam is delivered to a flow meter, such as a rotameter or the like, which discharges through a metering valve 21 to a delivery line 22. The inert gas which is to be combined with the steam to form the treatment atmosphere for the hot fluidization stage, air being employed in this case, is taken from an appropriate source, such as a compressed air main, and is fed by a supply line 23 to another rotameter or equivalent, the outlet of which communicates through a metering valve 25 with the delivery line 22. A purifier can be arranged upstream from the air rotameter in a manner similar to the steam supply if desired. The air supply line may be equipped with a pressure gauge (not shown) also upstream of the rotameter, as may the steam line in the event the steam main pressure is not constant. The two metering valves 21, 25 downstream of the respective flow meters may be replaced, if desired, by an automatic proportioning valve feeding the steam and inert gas in any predetermined proportion into delivery line 22. The mixture in line 22 is passed through a heater 28 of any convenient design, such as a high temperature steam heat exchanger, an electrical heater, or the like. Heater 28 functions to raise the temperature of the steam-inert gas mixture to the superheat region prior to its use to fluidize the flour and should, therefore, be capable of supplying a controllable amount of heat to the mixture. Line 22 continues beyond the heater to the point of use and may be provided with any needed control devices, such as temperature and pressure gauges.

Where a positive gauge pressure is imposed on the fluidizing stages, it is necessary that the flour to be treated be introduced into the system against this pressure. Therefore, the system must include a flour feeding stage capable of advancing the flour against this pressure and, simultaneously, providing a seal against loss of pressure. One arrangement suitable for this purpose is shown in the system of FIG. 1 under the general designation 30, the details thereof being more clearly visible in FIG. 2.

In this arrangement, the flour to be treated is placed in a feed hopper 31, equipped with a suitably driven agitator 32 to prevent bridging, which delivers the flour to the intake opening of a rotating feed screw 34 housed in tubular enclosure 36 and powered by variable speed motor 38 through a suitable gear box not shown. Agitator 32 can be also driven from motor 38 but is preferably powered by a separate motor. As can be best seen in FIG. 2, feed screw 34 is of compression design in that the room dimension of the flights 42 continuously increases toward the discharge end of the screw. While this result can be achieved by tapering the effective diameter of the screw and its housing toward the outlet end, it is preferred to maintain the diameter of the housing and the outside diameter of the screw constant and gradually enlarge the diameter of the shaft or central body of the screw as shown. It will thus be seen that as the screw rotates, the flour is compressed by the decreasing annular space 44 between the screw shaft 46 and the internal wall of housing 36 while being fed along the length of screw 34, and reaches a condition of maximum compression just prior to discharge. The extent to which the flour is compressed depends upon such variables as the pressure to be withstood and the length of the maximum compression zone and will be determined accordingly. Preferably, the interior surface of the housing immediately adjacent the intake opening, i.e. in the region where the flour is relatively uncompressed, is fluted, as at 43, to promote the forward motion of the flour particles by reducing aimless tumbling. Other feed mechanisms could be substituted, such as a star wheel, a staged array of venturis, among others, but the arrangement just described has been found particularly suitable since it is independent of any angle of repose, which is quite high in the case of flour, and is less subject to difficulties arising from the natural tendency of flour to become compacted.

In order to break up the caked or compressed flour for fluidization, the discharge end of screw 34 is reduced stepwise, as at 48 (see FIG. 2), and provided with a series of radially directed picker fingers 50 meshing or interdigitating with a cooperating series of stationary fingers 52 extending inwardly from housing 36, the clearance between the moving and fixed fingers being sufficiently small to remove any lumps and return the flour to substantially its original pulverulent condition. Beyond the picker stage of the feeder, the screw shaft terminates in a smooth extension 54 projecting through a discharge aperture in housing 36 and defining therewith an annular opening 56 through which the flour may enter the discharge conduit 59.

If the system is to be operated continuously for long periods of time, i.e. more than a few minutes, it is desirable that measures be taken to avoid prolonged preliminary heating of the flour while in the feeding stage. For example, the screw conveyor housing may be furnished with a cooling jacket 58 through which tap water can be circulated to absorb heat generated in the flour by friction during compression. Also, the feeding stage may be thermally isolated from the relatively hot fluidizing stage by interposing a heat barrier between the end of the feed screw and conduit 59, such as a water-jacketed collar 53 (see FIG. 2) likewise cooled with tap water. In this way, heat is prevented from being conducted from the hot fluidizing stage to the feeding stage through the piping.

The flour being expelled in pulverulent form from the discharge annulus of the screw feeder can be conveyed to the point of introduction in the fluidizing gas by means of gravity, i.e. by falling through a vertical stack opening at its lower end into the fluidizing tube. However, this can result in some of the fluidizing gas feeding back through the stack into the feeding stage, as all parts of a pressurized system tend to reach equilibrium, with a risk of erratic feeding and condensation of steam in the cooler atmosphere adjacent the feeder. Troublefree operation and positive feeding are better obtained by supplying inert gas, e.g. air, from a different main, as shown, or the same main as before, through a line 60, which may be equipped with a heater 61, a metering valve 62, and a flow meter, and introducing the same under pressure into the stepped section 48 of the screw conveyor adjacent the discharge end through a manifold 64 having a plurality of circumferentially spaced orifices 66 provided for this purpose in the screw housing. This gas, referred to here as "purge gas," assists the cooperating picker fingers in breaking up the compressed flour and placing it in suspended condition, i.e. in the form of a fine dust, for easy delivery into conduit 59 and thence to the fluidizing stage. The purge gas, when employed, enters the fluidization stage with the flour and becomes a part of the fluidizing medium. While the amount of the purge gas is ordinarily small compared to the fluidizing medium as a whole, it should nevertheless be taken into account in determining the effective proportion of steam in the medium and the amount of heat that should be provided by heater 28 to raise the medium to operating temperature.

The hot fluidizing stage of the system shown in FIG. 1 is generally designated 70 and comprises a tube 72, which may be either an extension of conduit 59 or a separate member smoothly connected to the end of conduit 59 remote from flour feeding stage 30 in any desired fashion, i.e., by a flange joint or the like (not shown). For sake of an easy distinction, the beginning of the stage may be assumed to be the point of introduction of the fluidizing gas. This gas is admitted to tube 72 with a substantial component of motion in the direction of movement of the flour suspension therein. In this way, a venturi effect is created which aids in drawing the flour suspension into tube 72. To this end, fluidizing gas delivery line 22 communicates with a toroidal-shaped manifold 74 (see FIG. 2) encircling fluidizing tube 72 and provided with a plurality of gas inlet ducts 76, preferably three or more in number, extending obliquely from circumferentially spaced points around the manifold to corresponding openings in the wall of tube 72. From the gas injection point forwardly, the fluidizing tube can be arranged in any of a variety of ways. It can, for example, be straight, curved as in ogee configuration, angled, or even coiled, as may best fit the spatial limitations of a given situation. Sharp bends are preferably avoided to reduce pressure losses and eliminate pockets where the flour could become lodged.

It will be apparent that condensation of the steam component of the fluidizing gas within the fluidizing stage of the system would be just as objectionable as within the feeding stage, if not more so. For this reason, heat losses from the fluidizing stage should be prevented as much as possible. This condition can be approximated by insulating the fluidizing tube along its length beginning at the fluidizing gas injection point. Preferred, however, is the use of a steam jacket 78 surrounding tube 72, to which steam can be supplied at a predetermined temperature. The jacket can, of course, be insulated on the outside, as indicated at 79, to reduce heat losses and protect operating personnel. The heat for destruction of microorganisms can even be supplied through the jacket instead of from heaters 28 and 61.

The suspension of flour, in the combined fluidizing gas and purge gas passes up through fluidizing tube 72 and on to a flour separation or transition stage, generally designated 80, which serves to isolate the hot fluidization stage from a cold fluidization stage and provide a smooth transition between the two stages. The transition stage includes a cyclone separator 82 into the upper end of which the flour suspension is introduced in a generally tangential direction to the cyclone wall. Consequently, a spinning motion is imparted to the flour, as indicated by the arrow in FIG. 1, which is separated from the gaseous fluidizing medium by centrifugal force and by reason of reduced velocity of the medium. The medium passes out of the cyclone through a gas discharge line 84 emerging from its top wall and empties to the atmosphere. A steam jacket 85 maintains cyclone 82 at essentially the same temperature as exists in the hot fluidization stage 70. To allow the pressure in the cyclone to be varied to impose the desired back pressure in the hot fluidizing stage, line 84 is provided with an automatic pressure regulating valve 86 which is capable of maintaining any desired pressure at the cyclone outlet. The flour in the suspension flowing into cyclone 82 quickly loses its velocity and settles downwardly through an opening in the cyclone bottom into a vertical length of conduit 90 connected to that opening. Conduit 90 serves as a quiescent zone preventing gas flow between the hot and cold stages as will be more fully explained shortly, and conveys the flour to the low temperature or cooling fluidization stage, generally designated 100. This includes a fluidizing tube 102 with which conduit 90 communicates through a T 104, the cooling fluidizing gas being introduced at T 104 from a suitable source. Except as hereinafter noted, the two fluidizing tubes may be structurally the same, although this is not essential, and the arrangement of tube 102 may vary as was indicated in connection with the description of tube 72.

As the combined cooling and fluidizing medium for cooling stage 100, one may use air or other inert gas in sterile condition and at a sufficiently low temperature to rapidly reduce the temperature of the flour suspended therein at least below its degradation point. As shown in FIG. 1, the cooling fluidizing medium is taken from the air main, rendered sterile by passage through a so-called sterilizing filter 101 of a type known in the art having sufficiently small interstices or bulk of filtering material to remove air-borne microorganisms, passed through a rotameter or other flow-measuring device and a metering valve 103, and delivered to one side of T 104 via line 105. Alternatively, the air may be sterilized by heating to sterilizing temperature followed by cooling. The quantity of cooling fluidizing medium introduced into tube 102 should be adequate to re-fluidize the flour particles settling out of hot cyclone 82 down through conduit 90 and convey the same the length of tube 102. To increase the rate of cooling, the gas itself may be pre-cooled before commingling with the flour, or tube 102 may be enclosed in a jacket 107 supplied with water or other liquid coolant at the desired temperature. Leaving the cooling stage, the flour suspension passes into a collection stage, generally identified as 110, which consists of an unheated or cooled cyclone 112 wherein the flour is separated from the gas in the same way as in heated cyclone 82, the flour being received in an uncontaminated receptacle or container 114 provided beneath the cyclone while the cooling medium passes out through the top of cyclone 112 through a line 115 open to the atmosphere. The cooling fluidizing stage can be maintained under a fixed pressure if desired. Like tube 102, cyclone 112 is enclosed by a jacket 113 for the circulation of water or other liquid coolant.

It is important to the successful operation of the two-stage fluidization system of FIG. 1 that no steam-containing gas be permitted to pass through the bottom vent of heated cyclone 82 into the cooling fluidizing tube 102, as the steam would condense at the temperatures prevailing in tube 102 and cause caking. At the same time, none of the cooling medium flowing in tube 102 should be allowed to enter the hot cyclone as this would interfere with the downward flow of flour, possibly causing some of the flour to be lost out of the top of the cyclone, and also reducing the temperature in the heated cyclone, at the risk of condensing some of the steam. Thus, the pressures prevailing in the lower part of the heated cyclone and in the leading end of tube 102 in the region of the T 104 must be maintained in at least substantial equilibrium. This condition can be achieved most readily by means of a throttling or pressure balancing valve 106 interposed in the cool fluidizing tube 102 just downstream of the flour introduction point, i.e. T 104, which valve can be adjusted to insure that all of the steam-containing fluidizing gas is removed in hot cyclone 82 while the cooling gas is confined in tube 102. Preferably, valve 106 is of the type shown in detail in FIG. 3 wherein a portion of the internal valve wall is formed by a flexible diaphragm 116 which can be distended inwardly any desired extent, indicated by the dotted line position, and thus reduce flow through the valve. A valve of this type has the advantages of freedom of irregular surfaces likely to entrap the flour particles and easy adaptation to automatic regulation; however, other types of throttling valves could be substituted with somewhat less satisfactory results. A diaphragm valve can also be employed with good advantage as the pressure control valve at the gas outlet of the heated cyclone, although in this case, the valve would function only to maintain a constant pressure.

The distension of diaphragm 116 can be controlled manually by a hand operated valve stem similar to standard ball or gate valves. Preferably, however, one utilizes an automatic control device which can be overridden by hand if desired, as indicated in the drawings. To this end, the upper end of the valve stem or operating rod 118 is connected to the diaphragm 120 of an air motor or servo-motor 122. Pressurized air is admitted from a supply line 124 to the housing 126 of the air motor on the opposite side of diaphragm 120 under the control of a transducer 128 functioning in response to an electrical signal initiated by means to be described. The transducer can be set for automatic or manual control by a selector knob 130 and includes a manual positioning handle 132 for preliminarily adjusting the diaphragm to proper neutral position or controlling the diaphragm directly for purposes of manual operation.

Valve 106 can be operated manually with satisfactory results by observing an appropriate condition existing in the system at selected points and adjusting the positioning handle 132 until throttling valve 106 has been moved sufficiently to create the desired quiescent state in conduit 90. For example, one can compare the pressure prevailing in hot cyclone with the pressure prevailing in the leading end of cooling tube 102 and adjust valve 106 until the two pressures are essentially equal. This procedure, however, requires pressure gauges of high sensitivity and may be difficult to carry out in practice. More reliable performance can be obtained by selecting relative humidity as the determining condition instead of pressure. In this case, one compares the relative humidity, i.e. dew point, of the cool fluidizing gas at the exhaust from line 115 at the top of cold cyclone 112 with its initial value before introduction into tube 102.

The relative humidity of the cool fluidizing gas must be below the condensation point at the temperature and pressure prevailing in the region of T 104 at all times. Being subject to atmospheric variations, room air may not satisfy this requirement. Accordingly, the use of a cooling gas, which may be air, having a constant relative humidity is preferred. Assuming that the incoming cool fluidizing gas is at constant relative humidity, any flow of steam-containing gas through conduit 90 into the tube 102 will be reflected by an increase in the dew point of the cooling gas at the point of discharge from the system, which can be corrected by closing throttling valve 106 the extent necessary to restore the dew point of the gas to its original value. The function of valve 106 may be more easily understood when one realizes that it works in conjunction with the automatic back pressure valve 86 in the exhaust line from heated cyclone 82. As throttling valve 106 opens, the pressure is decreased at the bottom of cyclone 82 and valve 86 closes a corresponding amount so as to maintain the selected constant pressure at the cyclone exhaust. Eventually, this forces steam into cool fluidizing tube 102 which increases the relative humidity and dew point of the cooling gas being discharged from cold cyclone 112. As valve 106 is closed to correct for the increase in dew point, the pressure at the bottom of the heated cyclone increases and valve 86 opens to compensate for the increase, allowing more of the steam-containing gas to exhaust there-through, reducing the amount of such gas being forced into tube 102 and, hence, the dew point of the gas leaving cyclone 112. When the latter value has been reduced to the point of at least substantial equality with the initial dew point of the cooling gas, throttling valve 106 is in correct operating position. Overcompensation by the throttling valve may be detected by observation of the exhaust gas from the heated cyclone. With valve 106 in proper operating position, this gas is free of flour and if particles of flour appear therein, the valve has been closed too much. This observation can be facilitated by condensing the hot exhaust gas and passing the condensate through an inspection tube. The presence of flour is indicated by turbidity in the condensate.

While very good performance has been obtained with manual adjustment of the throttling valve even for lengthy periods of operation, during which the system functions with relative stability once the valve has been properly adjusted, automatic control of the valve might be more advantageous for mass production. This can be achieved by means of instrumentation illustrated diagrammatically in FIG. 1. Thus, one places near the end of the cold fluidizing tube a special indicating dew point gauge 134, such as the "Dewcel" gauge made by the Foxboro Company of Foxboro, Massachusetts. This gauge generates an electrical control signal in response to variations in the dew point of the fluidizing gas leaving the tube, which control signal is supplied by an electrical lead, indicated by the dashed line, to the transducer 128 which automatically regulates the position of diaphragm 116 of the throttling valve 106 in inverse relation to changes in the dew point of the exhaust gases from cold cyclone 114. Obviously, where manual control of the throttling valve is exclusively contemplated, the special dew point gauge and motorized throttling valve can be replaced by conventional devices with a concomitant reduction in expense.

In addition to the elements specifically mentioned in the preceding description, pressure and temperature gauges may be added at the points indicated in the drawings and elsewhere as may be helpful for control and observation purposes. Also, the flour outlet from the cold cyclone can be arranged to discharge into a dough mixer or other flour processing equipment, if desired.

All possible measures to reduce the chance of accidental contamination of the flour should be taken in both designing and operating the apparatus for carrying out the invention. Thus, all tubing contacting the flour during and after heating should be of sanitary stainless steel. Also, all connections should be provided with vents for the introduction of high temperature sterilizing air or steam before operation. Air at 500° F. is sufficient for this purpose. Preliminary sterilization of the equipment is highly advisible. To this end, saturated steam at least about 300° F. may be circulated through all stages for a few minutes, say 10 minutes, assisted, if need be, by feeding steam or hot air into all jackets to heat them to the same temperature. Cleaning between production runs is also advisable and may be accomplished by circulating a strong detergent solution through all stages. For this purpose, a detergent consisting essentially of trisodium phosphate is quite effective and produces a mirror-like surface on the stainless steel after contact of ½ to 1 hour at a concentration of 1% in water at 150° F.

The rate at which the flour is processed will in large measure be determined by the size of the apparatus, e.g. the diameter of the fluidizing tube, and the rate of flow of the fluidizing gas mixture itself. To give an illustration of what the atcual values might be, a feed rate of 20–80 pounds of flour per hour has been found satisfactory for a fluidizing gas throughput of 0.77 total pound of gas/minute (including purge gas), i.e. about 46 lbs./hour, passing through a one inch I.D. experimental fluidizing tube. Obviously, however, the flour feed rate is not critical, there being little if any difference in the efficiency of the apparatus in destroying the specified microorganisms provided the temperature in the respective stages remains substantially constant within the limits already given. The amount of purge gas injected into the screw feeder need be just that sufficient to dislodge and propel the flour from the feeder to the fluidizing gas injection point. For the flour feed rate of 20–80 lbs./hr. mentioned above, about 0.006 pound-moles of purge air per minute, i.e. about 10 lbs./hr., is quite adequate but this can naturally be varied widely, dependent upon the exact feeder design, the distance the flour is to be moved, et cetera. This purge gas may be heated to the selected operating temperature prior to being injected into the flour cake, if desired.

One of the many advantages of using a fluidized system, such as that shown in the drawing, wherein the flour is commingled with steam-containing fluidizing gas, is that the temperature of the gas can be adjusted to supply essentially all of the heat needed to raise the flour to treatment temperature. Knowing the throughput rate of the flour and the other factors involved, it is a relatively simple matter to calculate the necessary temperature of the gas mixture. In general, an initial gas temperature of about 350–400° F. will be adequate to heat the flour suspension to the operative temperature within the prescribed range. Under such circumstances, the jackets on the first stage fluidizing tube and heated cyclone function primarily to supply merely enough heat to maintain a constant temperature throughout these parts of the system.

The length of the respective fluidization stages is determined mainly by what is required to heat the flour to the desired temperature and maintain that temperature in conjunction with the heated cyclone in the case of the heating stage and to cool the flour to the desired extent in the case of the cooling stage. This may vary to some extent, with different rates of flow. However, lengthy fluidizing tubes are better avoided to reduce pressure losses and eddy currents tending to form pockets of flour within the tubes. For example, tubes in the order of 15–25 feet in length have worked quite well at the stated flow rates. Control over the treatment temperature is effected most easily in the system of the drawings by means of the initial temperature of the fluidizing gas since variations in the feed rate of flour, unless increased drastically, has no significant effect on the treatment temperature. At a fixed weight of fluidizing gas per unit of time, an increase in the initial temperature thereof results in an increase in the volume of the gas and a corresponding decrease in the time required for the flour to traverse the fluidizing tube.

The cooling fluidizing gas may have a temperature of about 50–80° F. as may the coolant supplied to the jackets of the cooling fluidizing tube and the final cyclone collector.

If the outlet to the heated cyclone is to be maintained at a negative gauge pressure, as mentioned above, then the outlet to the cold cyclone would necessarily have to be maintained at a greater negative gauge pressure. In this event, the throttling valve would be manipulated to maintain an equilibrium between the negative gauge pressure at the outlet to the hot cyclone and the inlet to the cold fluidizing tube. Obviously, however, operation at super atmospheric, i.e. positive gauge, pressures in at least the heated stages is considerably simpler and more reliable, any leakage in the system being then outwardly rather than inwardly, and is, accordingly, preferred.

The effectiveness of the treatment in terms of the sterility achieved can be determined by standard statistical methodology developed in the bacteriology art. One such method utilizes a "most probable number" technique and is an adaptation of a procedure long used in estimating coliform densities in domestic water supplies. According to this procedure, a known amount of treated flour (e.g. 100 gm.) is introduced aseptically into a container containing a known amount (e.g. 440 gms.) of sterile bacteriological medium (e.g. Fluid Thioglycollate Medium) and mixed vigorously. From the container, replicate decimal aliquots of the mixture are transferred aseptically into a series of tubes either at a single or several different quantitative levels. The tubes are incubated a suitable time (2 weeks at 30–35° C.), then observed. If microbial growth is present as is indicated by any of an increase in turbidity, formation of a surface pellicle, development of odor, or actual microscopic examination, this fact is noted. From the number of positive results relative to the number of samples and their dilution, the "most probable number" can be determined from standard reference tables formed, for example, in Standard Methods for the Examination of Dairy Products, 10 ed. APHA, 1953 or Standard Methods for the Examination of Water, Sewage and Industrial Wastes, 10th, ed., APHA, 1955.

In addition to the test just described to ascertain the "most probable number," it is common practice to transfer samples at a given level of dilution onto sterile plates of appropriate nutrient medium which are incubated under conditions favoring organism growth, then observed, and the number of colonies per plate counted. The assumption is made that each colony represents one surviving organism. Thus, on multiplying the number of colonies by the dilution factor employed and averaging a number of plates together, a reasonable approximation of the number of surviving organisms per unit weight of treated material can be obtained. One such technique is known as the "standard plate count" or SPC. The SPC is considered a valid approximation as to samples which at the given dilution provide a count of 30–300 organisms per plate, on the theory that the count can be made with relative precision within this range under normal plating procedures. In cases where the count is less than 30, it is reported as less than 30 times the reciprocal of the lowest dilution employed. The samples of the flour treated in accordance with the invention almost invariably resulted in counts of less than 30 at the standard dilution employed so that the SPC, because of the statistical limitation imposed, was incapable of serving as a meaningful basis for comparing the results of the treatment under various conditions. Consequently, a modification of the SPC was adapted whereby the actual number of colonies of bacteria per plate multiplied by the appropriate dilution factor was reported, in an average with all of the similar samples plated, as the "actual plate estimate" or APE. A procedure similar to the APE but adapted to detect surviving molds was also used, the results being reported as the "absolute mold estimate" or AME.

A gross test procedure employed particularly in the case of molds involved collecting 100 gm. samples directly in a liquid mold growth medium having its pH adjusted to inhibit bacterial growth while promoting mold growth, incubating the medium thus inoculated at 80° F. and making periodic observations for the presence of mold. This is helpful in confirming the results of other tests taken with smaller samples. Untreated flour invariably shows evidence of mold growth within three days of incubation in this gross test.

To further illustrate the process, the following working examples are included. All examples were processed in a laboratory apparatus constructed essentially in accordance with the system shown diagrammatically in FIG. 1; certain conditions were accordingly fixed. In this apparatus both fluidizing tubes had a nominal I.D. of 1 inch, the high temperature fluidizing tube was 15 feet long and the low temperature tube 17.5 feet long; the inert gas and purge gas were clean air while the cooling fluidizing gas was sterile air, the purge gas flow rate was 0.006 pound-moles/minute and the cooling gas was introduced at room temperature (75° F.) at a flow rate of 3 lbs./min.; the pressure at the outlet of the heated cyclone was maintained at 10 p.s.i.g. and the pressure at the outlet of the cold cyclone was atmospheric. Other conditions are as specified hereinafter. By way of explanation of the latter, the flow rate value is for the high temperature fluidizing gas and includes the amount of purge gas just stated; the treatment temperature value is that of the flour measured at the top of the heated cyclone but also corresponds substantially to that of the steam supplied to the jackets of the high temperature stages, i.e. the heated fluidizing tube and heated cyclone; and the cooling water temperature was that of the water supplied to the jacket of the cooling fluidizing tube. In all runs, the throttling valve was adjusted to maintain proper separation of the fluidizing gases within the respective stages. The apparatus was cleansed and sterilized in the manner described before all runs. All samples were at room temperature (75° F.) before processing.

*Example I*

The flour processed was "Flaky Crust" having an initial mold count of 4000/gm., the steam content of the fluidizing gas was 30 mole percent, the pressure maintained at the gas outlet of the heated cyclone was 10 p.s.i., the cooling water was at 70° F., the treatment temperature was 230° F., the outlet flour temperature was 75° F., the flour feed rate was 20 lbs./hour, and the total gas flow through the high temperature fluidizing stage was 0.03 pounds-moles/minute. The average time the flour remained in the system above room temperature was calculated to be about 1.5 sec. while the average time the flour was held above about 140° F. was estimated to be about 1 second.

The treated flour was found to contain an AME of 0 per 1/10 gram. This treated flour was used in the production of pie dough according to a standard laboratory formulation. This dough was considered by a qualified test panel to have a quality comparable to that produced from untreated flour. A similar run at 240° F. produced the same result.

*Example II*

The flour treated was "Lite Maid" flour inoculated with Penicillium mold to a count of 30,000 per gram. Individual samples of this flour were processed as in Example I, except that the cooling water was 75° F., at temperatures ranging from 205° F.–250° F. The final flour temperature was 75° F. The results of mold counts on the samples treated at the indicated temperature are summarized below:

| Treatment temperature, ° F.: | AME |
|---|---|
| 205 | 20 |
| 210 | 1 |
| 220 | 0 |
| 225 | 200 |
| 230 | 12 |
| 240 | 2 |
| 250 | 4 |

The total "dwell time" of the flour within the system was the same as in Example I; the duration of exposure to a temperature in excess of 150° F. was estimated to range between about 0.75 to about 1 second.

If Example II is repeated with a total gas flow through the high temperature stage of about 0.01 lb. moles/minute, giving a dwell time above about 140° F. of about 2.5–3 sec., equal or better results are obtained.

*Example III*

The flour was "Washburn Glory" flour inoculated with molds to a count of 9,000 to 12,000 per gram. Individual samples of this flour were processed at a feed rate of 30.5 lbs./hr. as in Example II at temperatures ranging from 190–250° F. except that no steam was present in the fluidizing gas, and the cooling water was 60° F. The final flour temperature remained at 75° F. The results of microbiological examination are as follows:

| Treatment temperature, °F.: | AME/gm. |
|---|---|
| 250 | 2100 |
| 240 | 3700 |
| 230 | 1700 |
| 220 | 2100 |
| 220 (repeat) | 2400 |
| 210 | 4500 |
| 200 | 1800 |
| 190 | 3000 |

A comparison of the results in Examples II and III shows the importance of the presence of steam in the fluidizing gas. In both examples mold-inoculated flour was treated at various temperatures. The only material difference between the two examples being that in Example II, 30 mole percent steam was used, while in the latter example the steam was entirely omitted, leaving only the heated air as the fluidizing gas in the first stage.

*Example IV*

"Lite Maid" flour having an initial AME of 700/gm. and an initial APE of 2900/gm. was processed as in Example II at temperatures varying between 225° and 240° with fluidizing gas containing steam in selected proportions from 20–80 mole percent. For the samples corresponding to 70 and 80 mole percent steam, the flour feed rate was 25 lbs./hr. while the feed rate for the remaining samples was 30.5 lbs./hour. The results were as follows:

| Temp., °F. | Mole Percent Steam | APE/gm. | AME/gm. |
|---|---|---|---|
| 238 | 80 | 350 | 720 |
| 220 | 70 | 100 | 0 |
| 240 | 60 | 350 | 0 |
| 230 | 50 | 70 | 0 |
| 225 | 40 | 340 | 0 |
| 230 | 30 | 65 | 0 |
| 225 | 20 | 140 | 0 |

The approximately 25% and 50% increase in the flow feed rate affected the dwell time and exposure times to no significant degree.

*Example V*

At least three samples of flour processed at each of the temperature levels according to Examples II and III were subjected to the simple gross test for mold growth, as described, for a period of six weeks, observations being made at weekly intervals, to compare the effectiveness of treatment with and without steam, respectively. The results are summarized in the following tests:

| Flour | No. Samples | Treatment Temp., °F. | No. of Samples Showing Mold Growth After— | | | | | |
|---|---|---|---|---|---|---|---|---|
| | | | 1 wk. | 2 wks. | 3 wks. | 4 wks. | 5 wks. | 6 wks. |
| Ex. II | 3 | 250 | 0 | 0 | 0 | 0 | 0 | 0 |
| Ex. II | 3 | 240 | 0 | 0 | 1 | 1 | 1 | 1 |
| Ex. II | 5 | 230 | 0 | 1 | 1 | 1 | 1 | 1 |
| Ex. II | 3 | 225 | 0 | 2 | 2 | 2 | 2 | 2 |
| Ex. II | 6 | 220 | 0 | 0 | 0 | 0 | 0 | 1 |
| Ex. II | 6 | 210 | 0 | 0 | 0 | 0 | 0 | 0 |
| Ex. II | 6 | 205 | 0 | 0 | 0 | 0 | 0 | 1 |
| Control | 2 | | 2 | 2 | 2 | 2 | 2 | 2 |
| Ex. III | 24 | [1] 250–190 | 24 | 24 | 24 | 24 | 24 | 24 |
| Control | 3 | | 3 | 3 | 3 | 3 | 3 | 3 |

[1] No steam.

*Example V*

"Lite Maid" flour having an initial APE of 900/gm. and an initial AME of 150/gm. was processed at a feed rate of 52 lbs./hr. in an 8 hour run during which the treatment temperature was held constant at 230° F. (235° F.), the cooling water temperature at 80° F. and the final flour temperature at 80° F. The steam content of the first stage fluidizing gas was 30 mole percent and the flow rate of this gas was 0.03 lb.-moles/min. Samples were taken at intervals during the runs and tested with the following results.

| Temp., °F. | APE/gm. | AME/gm. |
|---|---|---|
| 230 | 110 | 0 |
| 230 | 100 | 0 |
| 230 | 130 | 0 |
| 230 | 100 | 0 |
| 230 | 50 | 0 |
| 230 | 130 | 0 |

The flour from the run described above was made into a pie dough with an experimental plastic-type shortening generally similar to commercial Crisco at a fat-flour solids ratio of 0.7, 1% salt and 0.2% sodium propionate, with sufficient sterile water to give a total moisture content of 19%. Five samples of the fresh shortening were examined for microbiological contamination; four of these gave an APE of 10/gm. or less and the fifth of 20/gm. while four gave an AME of 0/gm. and the fifth ½/gm. Samples of the completed dough were likewise examined while fresh in some cases and after aging for one month at 50° F., i.e., under refrigeration, in other cases with the following results:

| Fresh | | | One Month Aging (at 50° F.) | | | | | |
|---|---|---|---|---|---|---|---|---|
| Sample No. | APE/g. | AME/g. | Sample No. | APE/g. | AME/g. | E. Coli/g. | Staphylococci/g. | Salmonella/g. |
| 1 | 64 | 0 | 11 | 10 | 0 | 0 | 0 | 0 |
| 2 | 10 | 0 | 12 | 40 | 0 | 0 | 0 | 0 |
| 3 | 60 | 0 | 13 | 40 | 0 | 0 | 0 | 0 |
| 4 | 50 | 0 | 14 | 20 | 0 | 0 | 0 | 0 |
| 5 | 20 | 0 | 15 | 10 | 0 | 0 | 0 | 0 |
| 6 | 60 | 0 | 16 | 20 | ½ | 0 | 0 | 0 |
| 7 | 40 | 0 | 17 | 20 | 0 | 0 | 0 | 0 |
| 8 | 50 | ½ | 18 | 40 | 0 | 0 | 0 | 0 |
| 9 | 50 | ½ | 19 | 30 | 0 | 0 | 0 | 0 |
| 10 | 80 | 0 | 20 | 0 | 0 | 0 | 0 | 0 |

Additional samples of the pie dough, some fresh and other after 2 months aging at 50° F., were tested by a panel of housewives. Over 60% of the panel rated the dough, either fresh or aged, equal or superior in quality to their own homemade doughs.

*Example VI*

To determine the effect upon flour functionality of the treatment, Lite Maid flour was processed in a six hour run at treatment temperatures varying between 220–240° F., flour feed rates at both 30.5 and 80 lbs./hr. with the fluidizing in the first stage containing 30 mol percent steam and introduced at a rate of 0.03 lb.-moles/min., a cooling water temperature of 70° F. and a final flour temperature of 72–75° F. No biological tests were made. Instead, the flour was prepared in pie dough and tested for sheet strength in comparison with the same untreated flour made into a dough in the same way. The sheet strength of the dough prepared from untreated flour was 3.5 while that of the dough containing the treated flour varied between 3.0 and 3.2.

What is claimed is:

1. A multi-stage fluidization apparatus for contacting a pulverulent solid with a plurality of gaseous atmospheres in continuous succession without substantial mixing of said atmospheres, said apparatus comprising a first fluidization tube, means for introducing said solid at a controlled rate in admixture with a first fluidizing gas into one end of said first tube, a second fluidizing tube, means at the other end of said first tube for separating said solid from said first fluidizing gas while exhausting the latter to the atmosphere, and for continuously delivering said separated solid to one end of said second tube, said last-named means establishing a closed path between the respective ends of said tubes, means for introducing into said one end of said second tube a second fluidizing gas incompatible with said first fluidizing gas, means for regulating the pressure in said second tube to prevent the flow of said first fluidizing gas into said second tube and to prevent the flow of said second fluidizing gas into said separating means at the end of said first tube and means for collecting the solid at the other end of said second tube.

2. A multi-stage fluidization apparatus for contacting a pulverulent solid with a plurality of gaseous atmospheres in continuous succession without substantial mixing of said atmospheres, said apparatus comprising a first fluidization tube, means for introducing said solid at a controlled rate in admixture with a first fluidizing gas into one end of said first tube, a second fluidizing tube, means at the other end of said first tube for separating said solid from said first fluidizing gas while exhausting the latter to the atmosphere, and for continuously delivering said separated solid to one end of said second tube, said separating means comprising an enclosed chamber receiving said solid from said other end of said first tube, an outlet adjacent the top of said chamber for discharging said first gas from said chamber, means at said outlet for maintaining a substantially constant pressure adjacent the top of said chamber, an outlet adjacent the bottom of said chamber for discharging the separated solid therefrom, and a generally vertically extending passageway in free communication with said last-named outlet and said one end of said second tube through which passageway the separated solid falls freely, said last-named means establishing communication between the respective ends of said tubes, means for introducing into said one end of said second tube a second fluidizing gas incompatible with said first fluidizing gas, means for regulating the pressure at which said second gas is introduced into said second tube to maintain said pressure substantially equal to the pressure in said separating means, whereby gas flow between said tubes is precluded, and means for collecting the solid at the other end of said second tube.

3. An apparatus as in claim 2 wherein said chamber comprises a generally vertically arranged cylinder of a diameter substantially exceeding the diameter of said first tube, the other end of said first tube communicating within the interior of said cylinder substantially in tangential relationship to said cylinder, whereby the velocity of said first gas upon entry to said cylinder is sufficiently reduced to allow said solid to separate by gravity from said first gas.

References Cited by the Examiner
FOREIGN PATENTS
463,060   3/1937   Great Britain.

FREDERICK L. MATTESON, Jr, *Primary Examiner.*

J. J. CAMBY, *Assistant Examiner.*